United States Patent [19]

Götz et al.

[11] Patent Number: 5,281,006
[45] Date of Patent: Jan. 25, 1994

[54] METHOD OF DETERMINING AN INSTATANEOUSLY OPTIMUM PRESSURE OF TRAILER OR SEMITRAILER BRAKES

[75] Inventors: Jügen Götz, Lorch; Peter Woll, Bruchsal; Jochen Horwath, Unterensingen, all of Fed. Rep. of Germany

[73] Assignee: Mercedes-Benz AG, Fed. Rep. of Germany

[21] Appl. No.: 789,844

[22] Filed: Nov. 8, 1991

[30] Foreign Application Priority Data

Nov. 10, 1990 [DE] Fed. Rep. of Germany ....... 4035805

[51] Int. Cl.$^5$ .............................................. B60T 13/00
[52] U.S. Cl. .......................................... 303/7; 303/15
[58] Field of Search ................ 303/7, 15, 20, 22.1; 188/3 R, 112 R

[56] References Cited

U.S. PATENT DOCUMENTS

| | | | |
|---|---|---|---|
| 3,955,652 | 5/1976 | Nilsson et al. | 188/3 R X |
| 4,265,492 | 5/1981 | Pöllinger | 303/14 |
| 4,763,958 | 8/1988 | Öhrgard | 303/7 X |
| 4,984,852 | 1/1991 | McNinch, Jr. | 303/7 X |
| 5,080,445 | 1/1992 | Breasley et al. | 303/7 |

FOREIGN PATENT DOCUMENTS

| | | |
|---|---|---|
| 2164325 | 2/1975 | Fed. Rep. of Germany . |
| 3920096 | 4/1990 | Fed. Rep. of Germany . |
| 3901270 | 7/1990 | Fed. Rep. of Germany . |

Primary Examiner—Robert J. Oberleitner
Assistant Examiner—Lee W. Young
Attorney, Agent, or Firm—Evenson, McKeown, Edwards & Lenahan

[57] ABSTRACT

A method determines an instantaneously optimum pressure of brakes of a trailer connected to a tractor. Regulation to a desired value of a coupling force existing between the tractor and the trailer is performed by varying the braking pressure of the trailer. A target value, in a braking process, of the pressure of the trailer brakes is determined at least indirectly from the assignment of pressure of the trailer brakes during at least one preceding braking process in which the coupling force has been set equal to its desired value.

15 Claims, 5 Drawing Sheets

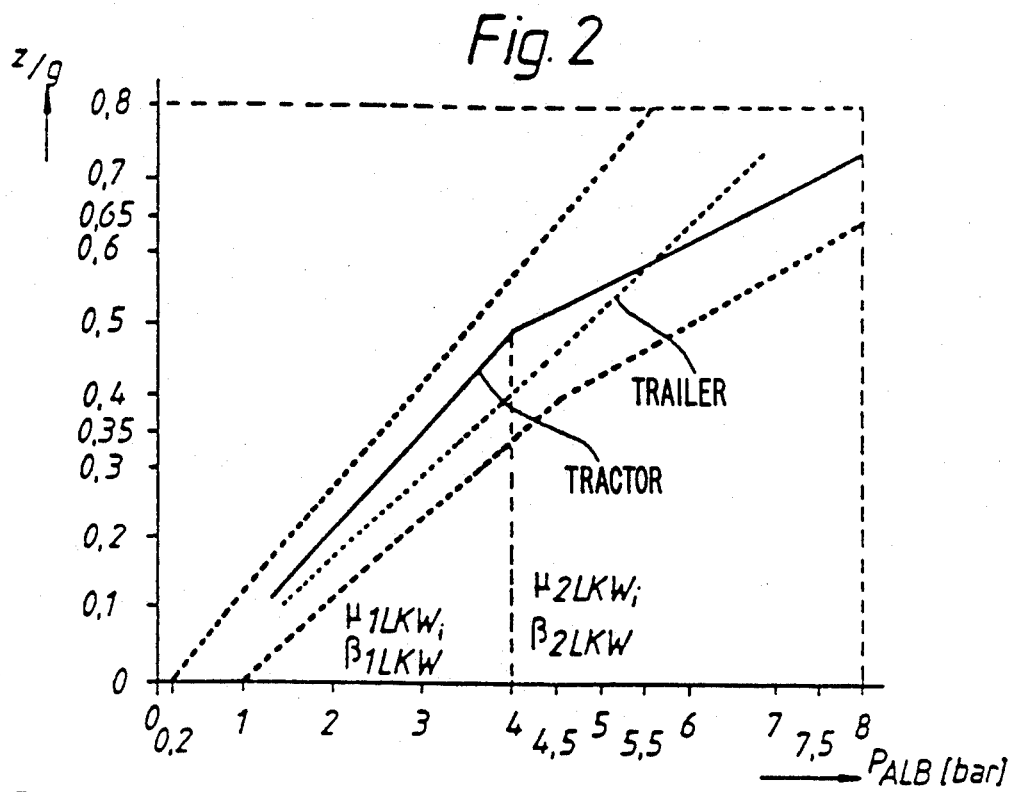
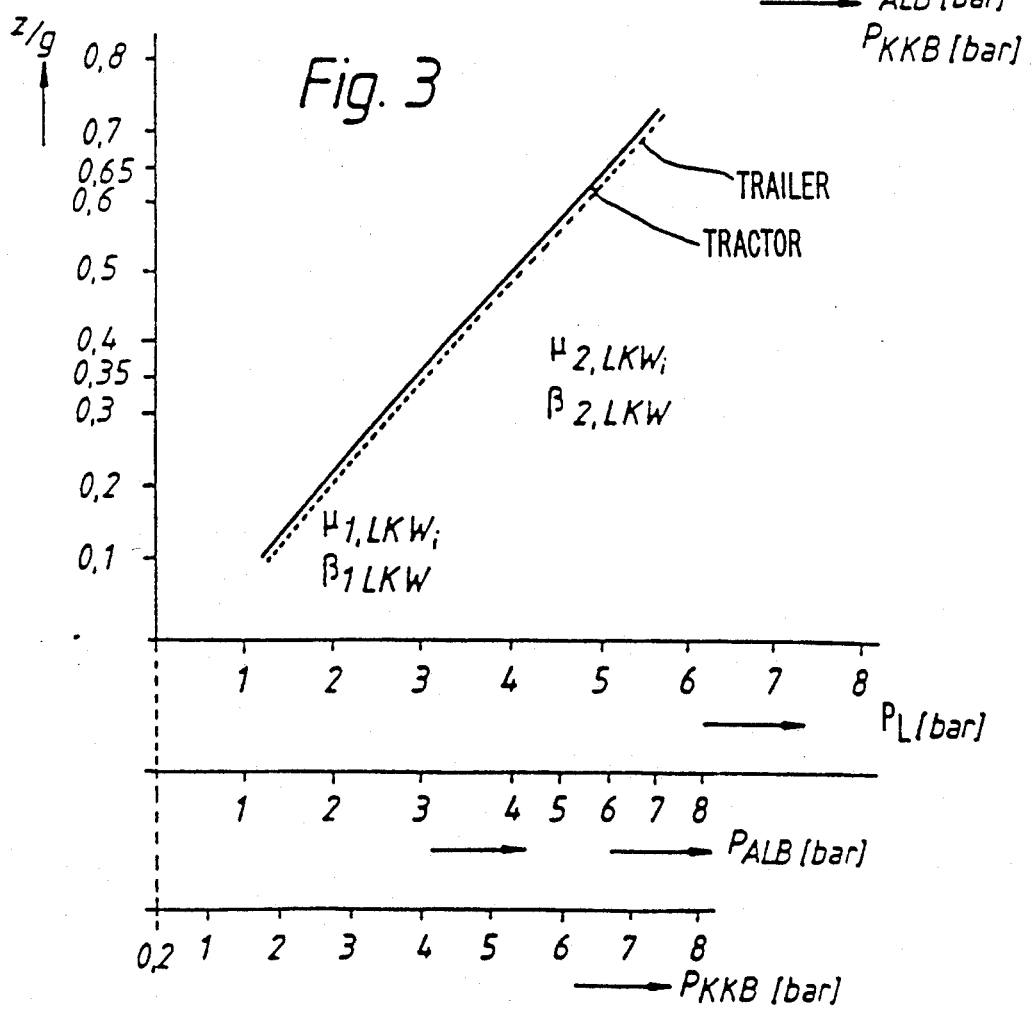

METHOD OF DETERMINING AN INSTATANEOUSLY OPTIMUM PRESSURE OF TRAILER OR SEMITRAILER BRAKES

BACKGROUND AND SUMMARY OF THE INVENTION

The invention relates to a method determining an instantaneously optimum pressure of the brakes of a trailer or semitrailer connected to a tractor and, more particularly, to such a method for the purpose of adjusting the coupling force occurring between the tractor and the trailer or semitrailer to conditions instantaneously present.

DE 3,901,270 AS discloses a braking device in which during the first braking, the actual pressure value at the trailer is varied until the measured drawbar force vanishes. A braking pressure correction value is derived from the difference between the prescribed desired pressure value and the actual pressure value. No information or suggestion is provided, however, as to how the braking pressure correction value is to be derived.

Furthermore, DT 2,164,352 B2 discloses a method in accordance with which the medium braking pressure on the wheels of a motor vehicle trailer is regulated as a function of the coupling force between the tractor and the trailer. In this case, the medium braking pressure is regulated such that the coupling force vanishes or becomes as small as possible. It is taken into account whether the braking process is stable or unstable, i.e. whether, in the case of the occurrence of a positive coupling force, a greater retardation of the trailer is produced and thus the coupling force become smaller given an increase in the medium braking pressure or whether the wheels of the trailer lock, and thus the coupling force increases once again, give an increase in the medium braking pressure.

It could be regarded as disadvantageous in the previously known methods that braking pressure is not set to an adjusted value until the occurrence of a coupling force, as a result of which under certain circumstances driving comfort could possibly be impaired during the braking process.

It is an object of the present invention to improve upon known methods such that during a braking process as much driving comfort as possible is guaranteed simultaneously with driving safety that is as high as possible during the braking process.

In a general method of determining an instantaneous optimum braking pressure for a trailer or semi-trailer connected to a tractor, this object has been achieved according to the present invention by providing that, during at least one braking process in which the coupling force has been set, equal to its desired value, the assignment of pressure of the brakes of the tractor to the pressure is determined, taking account of the certain parameters. A conclusion is drawn from the determined assignments in the range of small values of the pressure on the assignments in the range of larger values of the pressure, and during subsequent braking processes, the target value of the pressure of the brakes of the trailer is determined at least indirectly from the assignment of the pressure of the brakes of the tractor to the pressure.

By contrast with known methods, advantages of the present invention include that, when the method according to the invention is applied, the desired value of the coupling force can be achieved very quickly.

In the method according to the present invention for determining an instantaneously optimum braking pressure for a trailer or semitrailer connected to a tractor, a first value is derived for an instantaneously optimum braking pressure by assigning to the instantaneous position of the braking value sensor (brake pedal) a value, derived from earlier stationary braking processes, of the braking pressure of the trailer or semitrailer as a target value of the braking pressure of the trailer or semitrailer. It is possible in this way to take account of differences arising in the individual brake systems, which can be based in different designs of the brake systems of the tractor and trailer or semitrailer or in different conditions with regard to ageing.

A stationary braking process is derived from the condition that over a relatively long period of time the coupling force is equal to zero or equal to the desired value of the coupling force. Deviations within a prescribed threshold value, which arise, for example, from measurement inaccuracies, likewise are recognized as a stationary braking process. In this case, this relatively long period of time can, in particular, be on the order of magnitude of approximately 0.5 s. A desired value of the coupling force is that is not equal to 0 can advantageously be used when the trailer is a central axis trailer. In the case of such a road train, a component of the braking force for the trailer, which corresponds to the supporting force on the tractor, must be accepted by the tractor. In the same way, the method can also be used for semitrailer trains. Only the term "trailer" will be generally used in the following description, although all other possibilities of composing a road train that are indicated here are understood to be encompassed by the present invention.

Both changes in the composition (that is to say a change in the trailer attached to the tractor) of the tractor-trailer combination and changes in the loading of the tractor-trailer combination are advantageously taken into account by resetting the stored assignments in the case of changes in the composition and/or changes in the loading. Changes in the composition of the tractor-trailer combination, as well as changes in the loading can be derived in this case, for example, from a relatively long stationary period or an engine standstill. The duration of this relatively long standstill can be fixed in this case at, say, 2 minutes.

After the braking pressure of the trailer assigned to the instantaneous position of the braking value sensor has been set, this braking pressure can then additionally be regulated so that the coupling force present between the tractor and the trailer reaches its desired value. The assignment of the position of the braking value sensor to the braking pressure of the trailer can then be used as the assignment for a target braking pressure for a specific position of the braking value sensor if this regulation were to lead in turn to the occurrence of a stationary braking process.

Various indices will be used below for the pressures in the braking system. The pressure designation $P_{ALB}$ designates the pressure upstream of the automatically load-dependent braking force valve (ALB valve) of the tractor, and the pressure designation $P_{KKB}$ designates the pressure at the coupling head brake between the tractor and the trailer, and thus designates the braking pressure of the trailer.

BRIEF DESCRIPTION OF THE DRAWINGS

Other objects, advantages and novel features of the present invention will become apparent from the following detailed description of a currently contemplated embodiment when considered in conjunction with the accompanying drawings wherein:

FIG. 2 is a graph showing the qualitative variation of the deceleration z as a function of the pressure $P_{ALB}$ and $P_{KKB}$;

FIG. 3 is a graph showing an adjustment of the braking response of the trailer to the braking response of the tractor;

DETAILED DESCRIPTION OF THE DRAWINGS

Figure 1:
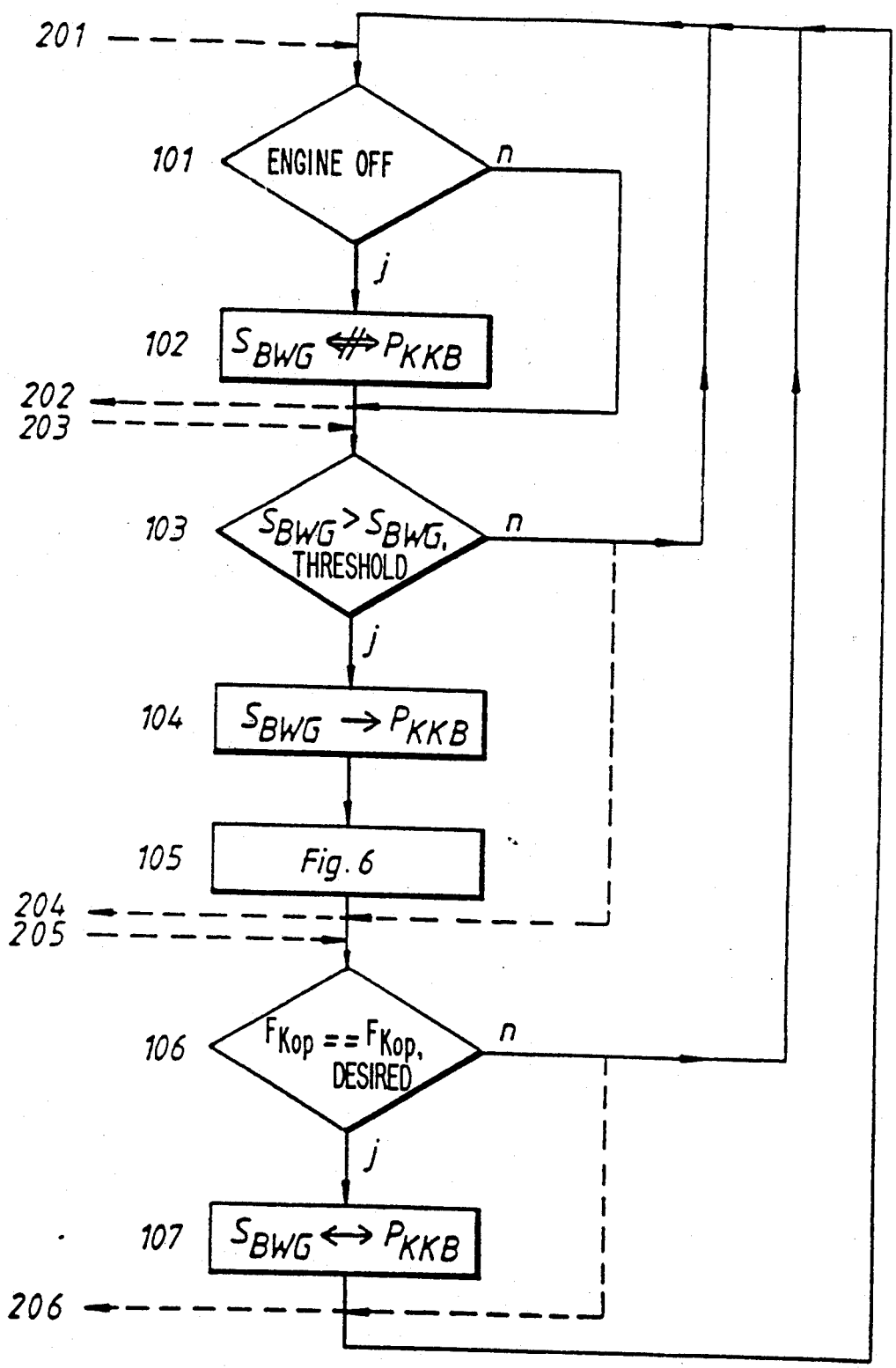
FIG. 1 is a flow diagram of a method according to the present invention for determining an instantaneously optimum pressure $P_{KKB}$ of the brakes of a trailer connected to a tractor.

FIG. 1 is a flow diagram of a method according to the invention, in which step 101 first checks whether the condition is fulfilled that the stored assignments of the position of the braking value sensor $s_{BWG}$ to the set pressure $p_{KKB}$ must be generally reset because it is possible that the loading and/or composition of the road train consisting of a tractor and a trailer has changed. This check is realized by checking whether the engine is off. In this case, there is a transition to the step 102, in which all the stored assignments of the position of the braking value sensor $s_{BWG}$ are reset to the set pressure $p_{KKB}$. The output tunings for assigning a pressure $p_{KKB}$ to the position $s_{BWG}$ of the braking value sensor, which are generally known then apply in turn.

This preliminary assignment can, for example, be such that the complete pressure $p_{ALB}$ is first passed on, so that the value of the pressure $p_{KKB}$ is equal to the value of the pressure $p_{ALB}$. If the stationary state is then reached during a braking process, this preliminary assignment can be further improved by using the ratio, arising during this braking process, between the pressure $p_{ALB}$ and the pressure $p_{KKB}$ during the next braking processes in order to determine a desired value for the pressure $p_{KKB}$ until the method described below of determining a desired value for the pressure $p_{KKB}$ is carried out. This preliminary assignment can be performed in this case by averaging over ten values.

It is then checked in the step 103 whether a braking process is present. This check is realized by establishing whether the position $s_{BWG}$ of the braking value sensor, e.g., a brake pedal in the embodiment shown in FIG. 1, is situated above a prescribed threshold value $s_{BWG, threshold}$. This threshold value can be on the order of magnitude of approximately 20% of the complete actuation of the brake pedal. If it has been established in this case that a braking process is present, a value of the pressure $p_{KKB}$ assigned to the instantaneous position $s_{BWG}$ of the braking value sensor is prescribed as the desired value in the step 104.

In addition to the target desired value, which was determined in accordance with the step 104, in accordance with the step 105, the actual value of the pressure $p_{KKB}$ is regulated to a value such that the coupling force $F_{Kop}$ between the tractor and the trailer is equal to the desired value $F_{Kop, desired}$ prescribed for this coupling force $F_{Kop}$.

It is then checked in the step 106 whether the braking process is stabilized, that is to say whether the coupling force $F_{Kop}$ has been equal to the desired value $F_{Kop, desired}$ of the coupling force for the duration above a prescribed threshold value, which can be equal, for example, to 0.5 s. Inaccuracies can arise owing to fluctuations in the measured values due to measurement errors and to disturbances due to unevennesses in the roadway, so that deviations of the coupling force below a threshold value, which can be on the order of magnitude of 3 kN, for example, are evaluated such that the coupling force $F_{Kop}$ is equal to the desired value $F_{kop, desired}$ of the coupling force. If this is the case, in accordance with step 107, the assignment of the position $s_{BWG}$ of the braking value sensor to the stabilized pressure $P_{KKB}$ is used to determine a desired value of the pressure $p_{KKB}$ in future braking processes.

It is also possible to subdivide the represented flow according to the present invention into a plurality of parts, the representation of FIG. 1 illustrating, for example only, a subdivision into three parts. In this case, it is possible to realize a cyclically repeating flow, induced by a central control unit, of each individual one of the three parts, different cycle times for the three parts then also being possible.

Thus, for example, the steps 101 and 102 can be combined by starting this first part induced by an input signal 201. The flow of this first part of the method according to the present invention is terminated once again by the return signal 202. Moreover, the steps 103, 104 and 105 can be combined starting this second part induced by an input signal 203, with the flow of this second part of the method according to the invention being terminated once again by the return signal 204. Moreover, the steps 106 and 107 are then combined by starting this third part induced by an input signal 205, with the flow of this third part of the method according to the present invention being terminated once again by the return signal 206.

FIG. 2 shows the qualitative variation of the deceleration z in units of the acceleration due to gravity g for a tractor and a trailer as a function of the respective pressure $p_{ALB}$ and $p_{KKB}$. The curve in FIG. 2 relating to the tractor illustrates that, for a pressure $p_{ALB}$ of 4 bar, the ALB valve switches over to a larger reduction given this value of the pressure $p_{ALB}$, and this can be seen from the corresponding kink in this curve. Consequently, the respective decelerations z can be specified for the tractor and the trailer in the form of the following equations:

For the tractor:

$$z_{LKW} = \mu_{1,LKW} \cdot p_{ALB} + \beta_{1,LKW} \quad 1 \text{ bar} \leq p_{ALB} \leq 4 \text{ bar,} \tag{1}$$

$$z_{LKW} = \mu_{2,LKW} \cdot p_{ALB} + \beta_{2,LKW} \quad 4 \text{ bar} \leq p_{ALB} \leq p_{max}. \tag{2}$$

For the trailer:

$$z_{Anh} = \mu_{Anh} \cdot p_{KKB} + \beta_{Anh} \quad 1 \text{ bar} \leq p_{KKB} \leq p_{max}. \tag{3}$$

In this case, the variable $\mu$ signifies a gradient in the corresponding straight line, and the variable $\beta$ corresponds to the respective point of intersection of the straight line with the z-axis. If, now, a desired value $F_{Kop, desired}$ of the coupling force of 0 is to be reached, this means that the decelerations $z_{LKW}$ and $z_{Anh}$ of the tractor and of the trailer must be equal. For the two ranges of the pressure $p_{ALB}$ smaller than a greater than 4 bar, there then arise from the equations (1) and (3) as well as (2) and (3) the equations (4) and (5), which are immediately transformed such that the dependence of the pressure $p_{KKB}$ on the pressure $p_{ALB}$ is directly visible.

$$p_{KKB} = (\mu_{1,LKW} \cdot p_{ALB} + \beta_{1,LKW} - \beta_{Anh})/\mu_{Anh} \tag{4}$$

$$0 \text{ bar} \leq p_{ALB} \leq 4 \text{ bar}$$

$$p_{KKB} = (\mu_{2,LKW} \cdot p_{ALB} + \beta_{2,LKW} - \beta_{Anh})/\mu_{Anh} \tag{5}$$

$$4 \text{ bar} \leq p_{ALB} \leq p_{max}.$$

It is thus evident that there is a linear dependence of the pressure $p_{KKB}$ on the pressure $p_{ALB}$. The segment of the axis and the gradient of this straight line depends on whether the pressure $p_{ALB}$ is smaller than or greater than 4 bar.

For each of the two regions $p_{ALB} < 4$ bar and $p_{ALB} > 4$ bar, it is thus possible in principle to determine the straight line equations (4) and (5) from at least two measuring points by determining the corresponding gradient and the corresponding segment of the axis. The result is thus an assignment of the pressure $p_{ALB}$ to the pressure $p_{KKB}$ which corresponds to a braking process in which the coupling force $F_{Kop}$ is equal to 0. Since the assignment of the pressure $p_{ALB}$ to the position of the braking value sensor $s_{BWG}$ is known, it is therefore possible to specify directly an assignment of the position of the braking value sensor $s_{BWG}$ to the pressure $p_{KKB}$, for which the coupling force $F_{Kop}$ becomes equal to 0. It is then possible to detect the position of the braking value sensor $s_{BWG}$ and to output a target value of the pressure $p_{KKB}$ in accordance with this position according to the step 104, so that a very quick decrease in the coupling force $F_{Kop}$ is guaranteed.

Since most braking processes take place in the range of small decelerations, it is to be expected that only relatively few measuring points will arise with which an assignment of the position $s_{BWG}$ of the braking value sensor to the pressure $p_{KKG}$ of the braking value sensor to the pressure $p_{KKB}$ could be carried out when the pressure $p_{ALB}$ is greater than 4 bar. In a particularly advantageous embodiment of the method according to the present invention, it is possible to draw, from the assignment of the position $s_{BWG}$ of the braking value sensor to the desired value of the pressure $p_{KKB}$ for values of the pressure $p_{ALB} < 4$ bar, a conclusion on the assignment of the position $s_{BWG}$ of the braking value sensor to the desired value of the pressure $p_{KKB}$ for values of the pressure $p_{ALB} > 4$ bar.

For example, it is possible to introduce for this purpose an auxiliary variable of the pressure with the designation $p_L$, which is equal to the pressure $p_{ALB}$ in the range $0 \leq p_{ALB} \leq 4$ bar. For values of the pressure $p_{ALB}$ greater than 4 bar, there then arises a conversion of the values of the pressure $p_{ALB}$ into associated values of the pressure $p_L$ in such a way that by means of equation (1) an assignment of the deceleration of the tractor $z_{LKW}$ is performed via the pressure $p_L$ instead of via the pressure $p_{ALB}$. This assignment then hold for the entire range of the pressure. The change in the assignment according to the other parameters of the equation (2) for values of the pressure $p_{ALB}$ greater than 4 bar is then taken into account by the conversion. According to this requirement, the result of thus following conversion of the pressure $p_{ALB}$ into the pressure $p_L$:

$$p_L = p_{ALB} \quad 0 \leq p_{ALB} \leq 4 \text{ bar} \tag{6}$$

$$p_L = (p_{ALB} - 4 \text{ bar}) \cdot \mu_{2,LKW}/\mu_{1,LKW} + 4 \text{ bar} \tag{7}$$

$$4 \text{ bar} \leq p_{ALB}.$$

According to FIG. 3, there thus arise two superimposed straight lines for the deceleration of the tractor $z_{LKW}$ plotted against the pressure $p_L$ and for the deceleration of the trailer $z_{Anh}$ plotted against the pressure $p_{KKB}$. The compression and the displacement of the axis for the pressure $p_{KKB}$ with respect to the axis for the pressure $p_L$ arises from the measured values recorded in the stationary case when the coupling force $F_{Kop}$ is equal to the desired value $F_{Kop, desired}$.

Since the assignment of the position of the braking value sensor $s_{BWG}$ to the pressure $p_{ALB}$ is now known, it is also possible to specify directly an assignment of the position of the braking value sensor $s_{BWG}$ to the pressure $p_L$ by transforming the equations (6) and (7). If, now, the assignments of the pressures $p_{KKB}$ as a function of the pressure $p_L$ are stored in the case of stationary braking processes (coupling force equal to the desired value), a straight line equation for the pressure $p_{KKB}$ as a function of the pressure $p_l$ can be specified directly from these assignments in accordance with the exemplary representation in FIG. 4. It is thus possible using this straight line equation and the assignment of the pressure $p_L$ to the position of the braking value sensor $s_{BWG}$ to specify an assignment of the position of the braking value sensor $s_{BWG}$ to the pressure $p_{KKB}$.

Figure 4:
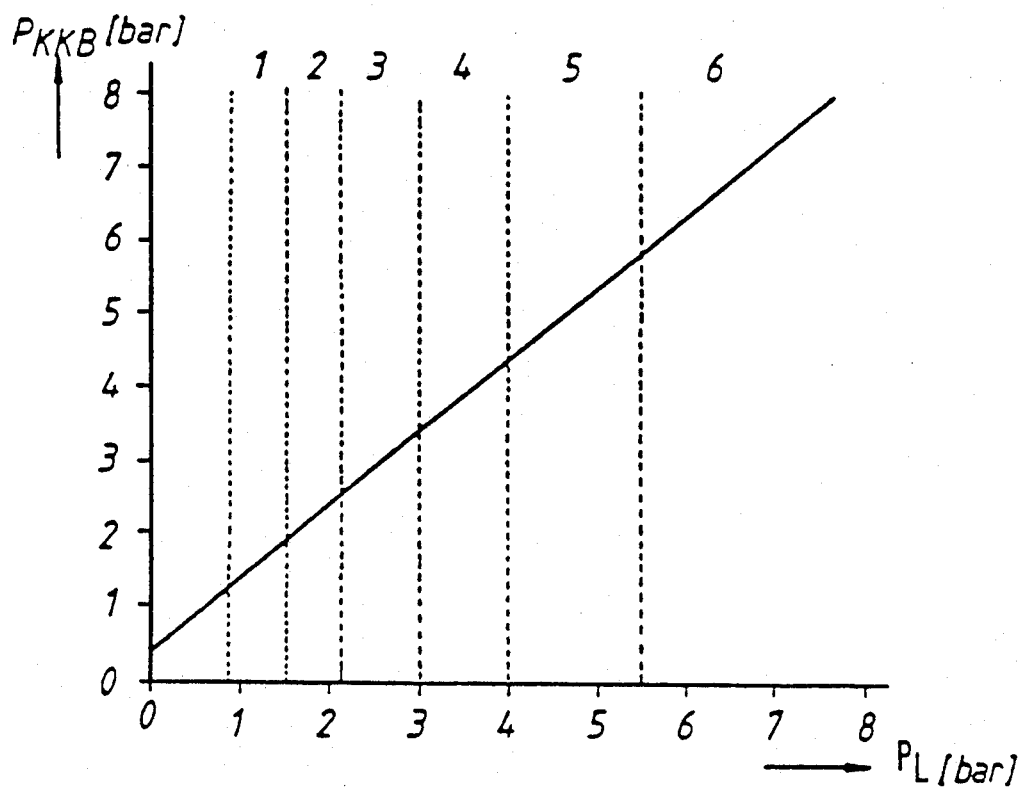
FIG. 4 is a graph showing the assignment of the pressure $P_{KKB}$ to the pressure $p_L$, which is given by the position $s_{BWG}$ of the braking value sensor.
Figure 5:
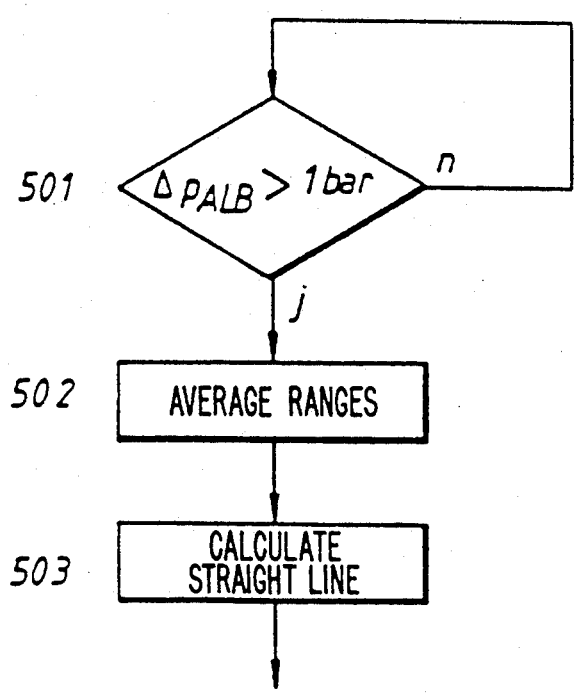
FIG. 5 is a flow diagram showing a numerically improved method of determining the graphical representation of FIG. 4 by computation.

Furthermore, some advantageous aspects with regard to the mode of procedure for determining a straight line equation of the pressure $p_{KKB}$ against the pressure $p_L$ are illustrated in FIGS. 4 and 5. In order for the purpose of avoiding numerical difficulties to guarantee a sufficient linear independence of the measuring points on which the calculation of the straight line equation is based, it is advantageous not to carry out the calculation of the straight line equation in accordance with the step 503 (FIG. 5) until at least two measuring points are present whose values of the pressure $p_L$ have a difference of at least 1 bar. This corresponds to the step 501 in the flow diagram of FIG. 5. Otherwise, owing to fluctuations in the measured values, numerical difficulties can arise in determining the straight line equation. For the same reason, in a particularly advantageous embodiment of the method according to the present invention, the range of all the pressure $p_L$ occurring can be subdivided in accordance with the step 502 as shown in FIGS. 4 and 5 into a plurality of ranges. An averaging of all the measured values occurring in the respective ranges is then firstly undertaken for each of these ranges. The straight line equation is then determined from the averaged values of these individual ranges. It has proved to be advantageous in this regard to subdivided the range of the pressures $p_L$ occurring into six ranges.

Moreover, during averaging more recent measured values can experience a larger weighting than earlier measured values. For example, the averaging of the earlier measured value can be weighted overall with 1, and the current measured value can be weighted with respect to the averaging of the earlier measured values with 0.25.

The method described so far represents only one exemplary embodiment of how an assignment of the position $s_{BWG}$ of the braking value sensor to the desired value of the pressure $p_{KKB}$ can be performed. It is essential for carrying out the present invention that the assignments determined during earlier stationary braking processes are used during future braking processes to determine a target value of the pressure $p_{KKB}$ in accordance with step 104 of FIG. 1.

Thus, it is also possible, for example, firstly to determine the variables $\mu_{Anh}$ and $\beta_{Anh}$ by equation (4). It is possible, for example, to perform this determination by the method of parameter identification using a plurality of measuring points. It is then also possible to solve equation (5) for values of the pressure $p_{ALB} > 4$ bar using the variables $\mu_{Anh}$ and $\beta_{Anh}$ determined in this way.

Figure 6:
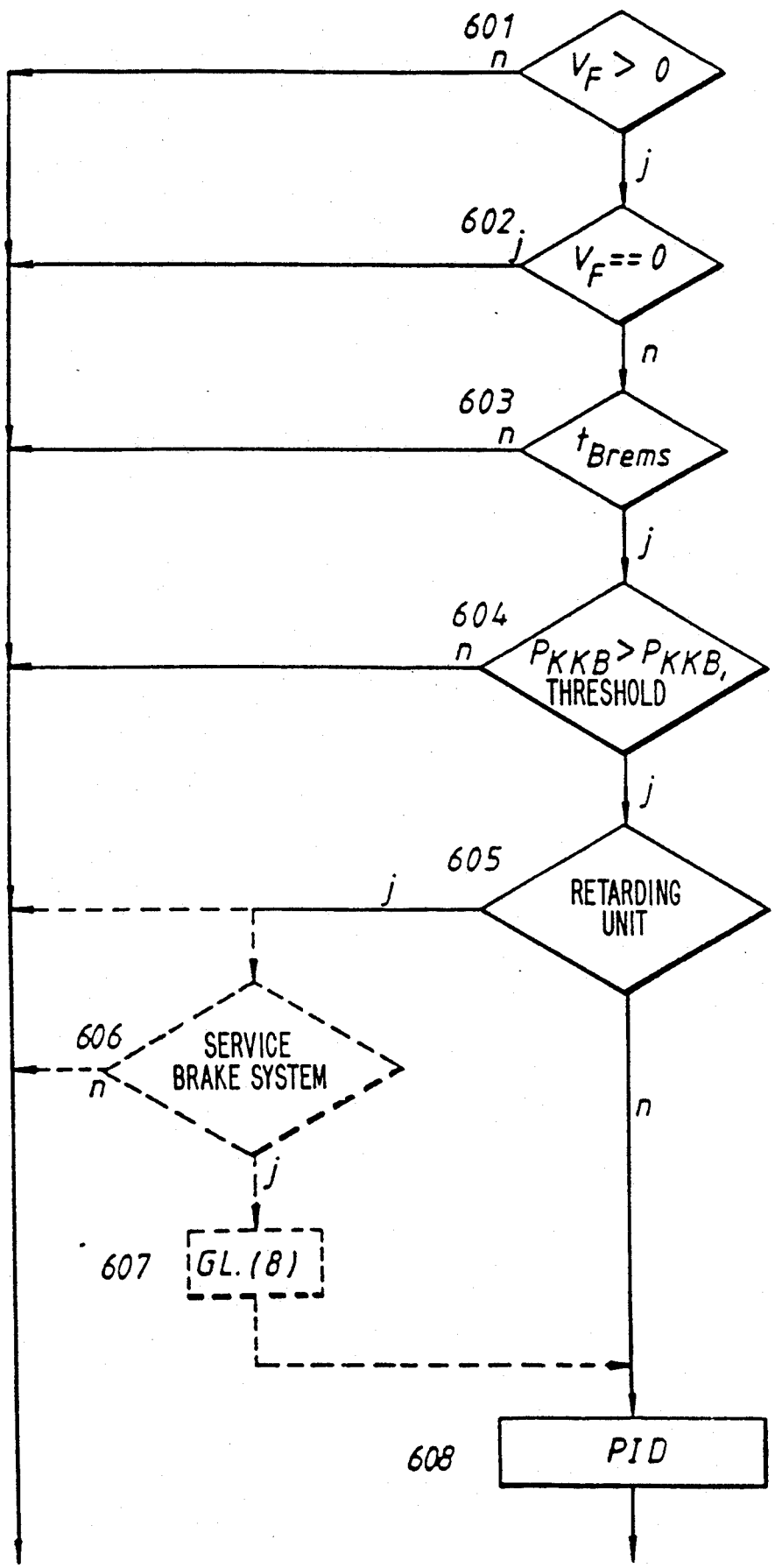
FIG. 6 is a flow diagram relating to the regulation of the coupling force $F_{Kop}$.

FIG. 6 illustrates a flow of the method of regulating the coupling force $F_{Kop}$. The output variable of this regulation results as a value of the pressure $p_{KKB}$ which is added to the target value of the pressure $p_{KKB}$ in accordance with step 104 (FIG. 1). The aim of this regulation is to bring any coupling forces $F_{Kop}$ still existing to their desired value $F_{Kop,desired}$ by this regulation. Since, however, it is possible in normal driving operation for situations to arise in which coupling forces occur which are not to be stabilized, some criteria need to be checked before this regulation is used.

Thus, for example, it is impermissible for this regulation to come into action in the event of driving backwards, since in the event of driving backwards the trailer proceeds in front of the tractor seen in the driving direction then obtaining. For example, if in the event of driving backwards the trailer brakes more weakly than the tractor, a coupling force $F_{Kop} > 0$ occurs. Such a coupling force $F_{Kop}$ is stabilized in the event of normal driving forwards by regulating downwardly the braking force or the braking pressure of the trailer. In the case of driving backwards, however, the coupling force $F_{Kop}$ would be precisely further increased by such a measure. This would be avoided if the sign of the actual value of the coupling force were changed during regulation. In an advantageous embodiment, the regulation can be blanked out in the event of driving backwards, since driving backwards is generally carried out only slowly and as a result of this it is also impossible for any critical driving conditions to arise even given the occurrence of coupling forces. Consequently, in the step 601 (FIG. 6), the condition as to whether driving backwards is present is checked using the vehicle speed $v_F$. If this is the case, no regulation of the coupling force is performed. On the other hand, a transition to step 602 in which a further check takes place is performed.

It is checked in step 602 whether the road train consisting of the tractor and the trailer is standing still. For example, in the event of stopping on a hill, it is possible for there to arise between the tractor and the trailer stresses which lead to lasting coupling forces as long as the road train remains stationary. These coupling forces are then independent of the pressure $p_{KKB}$ representing the braking pressure of the trailer. Consequently, it is checked in accordance with step 602 whether the road train is standing still, that is to say whether the vehicle speed $v_F$ is equal to 0. The coupling force regulation is switched off in the event of a stationary road train.

Furthermore, a negative peak coupling force can occur at the start of a braking process. Since the regulation then outputs a comparatively large manipulated variable, which then generally results in overshooting, it is advantageous to blank out the regulation at the start of a braking process. Consequently, step 603 checks whether the duration $t_{Brems}$ has elapsed since the start of the braking process. This duration $t_{Brems}$ depends essentially here on the response of the brakes of the trailer in relation to the brakes of the tractor, and can be situated in the order of magnitude of approximately 1 s. This peak coupling force at the start of a braking process can also advantageously be minimized by carrying out a pressure pulse at the start of a braking process, for example by applying a value of the pressure $p_{KKB}$ of approximately 3 bar for a duration of approximately 0.5 s.

Owing to valve hystereses and fluctuations in the friction of the wheel brakes, it is further advantageous not to activate the regulation until a pressure above a value of, for example, $p_{KKB} > 0.5$ bar, since otherwise instabilities in the regulation can arise. In the case of low braking pressures, i.e. a weak braking process, only slight retardations arise, so that the braking process cannot become unstable overall. Consequently, step 604 checks whether the pressure $p_{KKB}$ has overshot a specific threshold value $p_{KKB, threshold}$.

Moreover, step 605 checks whether the road train driver has switched on a retarding unit such as, for example, an engine brake or a retarder. In this case, coupling forces arise which are not to be stabilized. In the event of driving downhill, the brakes of the trailer could overheat if the tractor is retarded by the engine brake. In the case when the retarding unit alone is actuated, no regulation of the coupling force $F_{Kop}$ is therefore produced.

Step 606 checks whether the service brake system of the road train is further actuated in addition to the retarding unit. Here, it is possible in accordance with the representation in the step 607 to calculate as the desired value $F_{Kop, desired}$ of the coupling force a variable which takes account of the actuation of the retarding unit. In general, the coupling force $F_{Kop}$ is yielded by the following equation:

$$F_{Kop} = \frac{m_{Anh} * m_{LKW}}{m_{Anh} + m_{LKW}} * (z_{LKW} - z_{Anh}), \qquad (8)$$

where
$m_{Anh}$ signifies the mass of the trailer, and
$m_{LKW}$ signifies the mass of the tractor.

If the mass of the tractor and of the trailer are known in common with the retardation of the tractor resulting from the braking torque of the retarder, which leads to a braking force at the wheel, and the mass of the tractor, the value of the coupling force $F_{Kop}$ according to equation (8) and resulting from the operation of the retarding unit alone is obtained as the desired value $F_{Kop, desired}$ of the coupling force by setting the retardation of the trailer to equal zero. Alternatively, the determination of the coupling force $F_{Kop}$ can also be performed in the step 607 by taking account of the measured value of the coupling force $F_{Kop}$ during operation of the retarding unit without simultaneous actuation of the service brake system in the determination of the desired value $F_{Kop, desired}$. It is also likewise possible to blank out the regulation when actuating the retarding unit independently of the actuation of the service brake system.

In accordance with the representation in the step 608, the regulation of the pressure $p_{KKB}$ is then performed to such a value that the coupling force $F_{Kop}$ reaches its desired value $F_{Kop, desired}$. This regulation can be performed in this case, for example, by a PID controller, a stable control response having been achieved for a sampling time of the controller of approximately 50 ms and controller parameters which can assume the following orders of magnitude:

$K_p = 0.06$ bar/kN
$T_I = 0.73$ s
$T_D = 0.19$ s

There is likewise also the possibility in principle of using other types of controller such as, for example, a multi-position controller.

Figure 7:
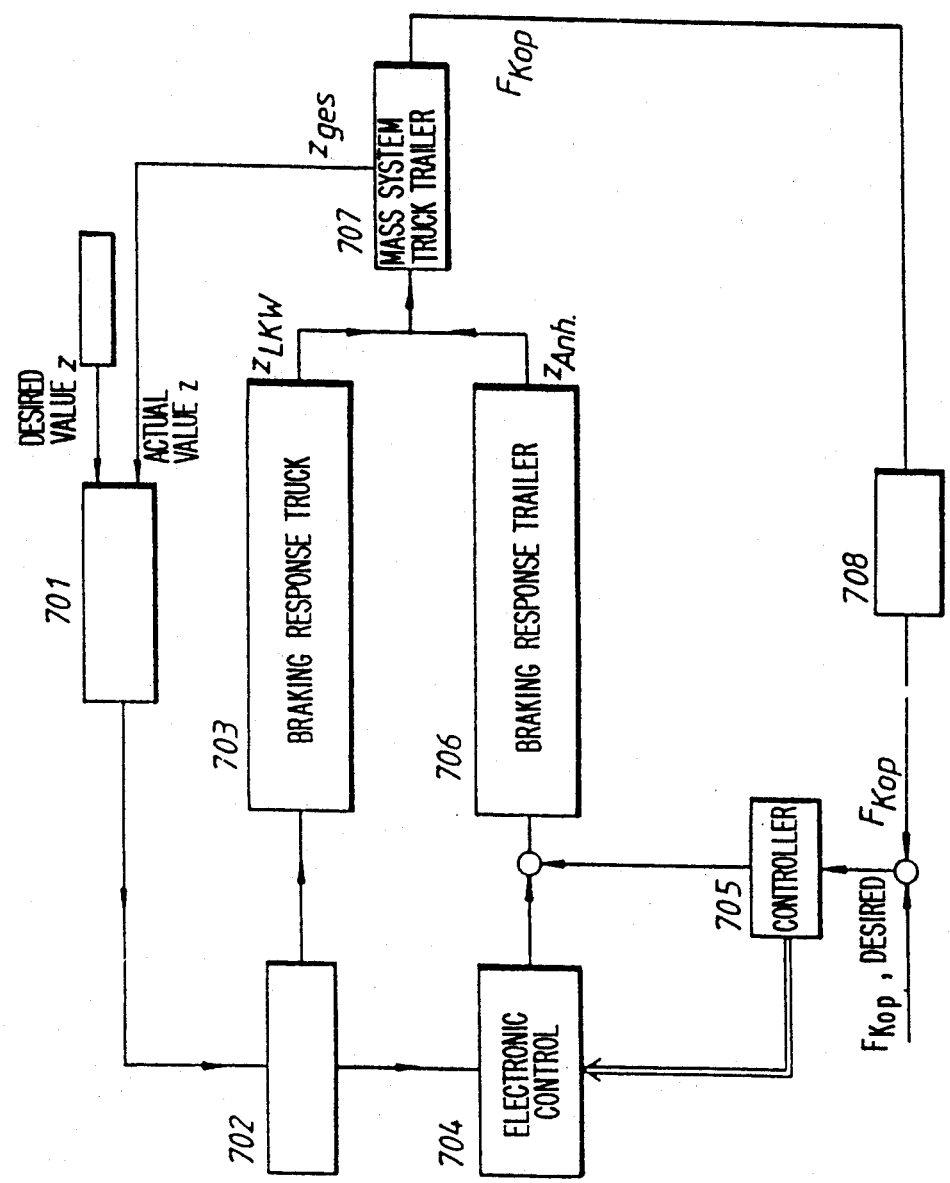
FIG. 7 is a system block diagram of the control and regulation in interplay when connected to the tractor and the trailer in accordance with the present invention.

A description of the functional block diagram of the apparatus shown in FIG. 7 for effecting the method of the present invention now follows. In block 701, the sensed actual value of the retardation z acts on the road train driver in common with a desired value for the retardation z arising from the general driving situation. The driver acts as a controller who, in block 702, actuates the brake pedal as a function of the system deviation. The actuation of the brake pedal leads into block 703 which takes into account the braking response of the truck directly to a retardation $z_{LKW}$ of the truck. Furthermore, the actuation of the brake pedal activates an electronic control 704, which outputs a target desired value for the pressure $p_{KKB}$ as a function of the actuation of the brake pedal. In addition, an output value of a controller 705 is added to this desired value. This result thus produced of the braking pressure $p_{KKB}$ then leads in block 706 to a retardation $z_{Anh}$ of the trailer. Moreover, if a stationary braking process is present, the electronic control 704 is directly influenced by the controller 705 by taking account of the assignment of the position of the brake pedal to the instantaneous value of the pressure $p_{KKB}$ in future determinations of a target desired value. In block 707, an overall retardation z of the road train arises, which retardation the driver perceives as the actual value. Moreover, in the event of differing retardations of the tractor and the trailer, coupling forces occur which are detected by the sensor 708 and are subtracted from a desired value $F_{Kop, desired}$ in order then to be fed to the controller 705 as input variable.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method of determining an instantaneously optimum brake pressure of one of a trailer and semitrailer coupled to a tractor to comprise a road train for the purpose of adjusting a coupling force occurring therebetween, during deceleration of the road train, to instantaneously present conditions, comprising the steps of:

a) determining first assignments of pressure of tractor brakes to the pressure of the trailer brakes during at least one braking process in which the coupling force has been set equal to a desired coupling force value, b) factoring into account parameters with respect to the first assignments to maintain a constant slope of the deceleration with respect to the pressure of the tractor brakes, c) deriving from the determined first assignments in a range of small values of the pressure of the tractor brakes, second assignments in a range of larger values of the pressure of the tractor brakes using said parameters, and d) determining, during subsequent braking processes, a target value of pressure of brakes of the trailer from the first and second assignments of the pressure of the brakes of the tractor to the pressure of the brakes of the trailer.

2. The method according to claim 1, wherein a regulation output variable is added to the target value of the pressure of the trailer brakes such that the coupling force becomes equal to the desired value.

3. The method according to claim 2, further comprising the step of precluding regulation of the coupling force when at least one of the following conditions occur: (a) the vehicle is driving backwards, (b) the tractor and one of the trailer and semitrailer is stationary, (c) from the start of the braking process only a time interval has elapsed such that the peak coupling force arising at the start of a braking process is still present, and (d) the braking process is weak.

4. The method according to claim 2, further comprising the step of precluding regulation of the coupling force if a retarding unit is in operation.

5. The method according to claim 3, wherein the step of precluding regulation of the coupling force occurs if a retarding unit is in operation.

6. The method according to claim 2, further comprising the step of stabilizing, in the event of simultaneous actuation of a retarding unit and a service brake system, only a coupling force arising from actuation of the service brake system.

7. The method according to claim 3, further comprising the step of stabilizing, in the event of simultaneous actuation of a retarding unit and a service brake system, only a coupling force arising from actuation of the service brake system.

8. The method according to claim 3, wherein a step of regulation of the pressure of the trailer brakes is effected with a PID-type controller.

9. The method according to claim 1, wherein the steps of determining and deriving assignments comprises directly assigning the pressure of the tractor brakes to the pressure of the trailer brakes.

10. The method according to claim 1, wherein a braking value sensor position, which determines a magnitude of the pressure of the tractor brakes, is assigned to the pressure of the trailer brakes.

11. The method according to claim 1, further comprising the steps of converting the pressure of the tractor brakes into a value of an auxiliary variable pressure such that a continuous linear relationship results between a tractor deceleration and the auxiliary variable pressure, determining a linear relationship between the pressure of the tractor brakes and the auxiliary variable pressure from at least two measuring points in order to determine the target value of the pressure of the trailer brakes, and determining an assignment of a braking value sensor position to the pressure of the trailer brakes using the assignment between the auxiliary variable pressure and the braking value sensor position, when the coupling force is equal to desired value.

12. The method according to claim 11, wherein the step of converting into the auxiliary variable pressure occurs when a minimum distance between at least two measured values for determining the value of the auxiliary variable pressure is greater than 1 bar.

13. The method according to claim 12, wherein the differences in measured values are further subdivided into individual ranges with regard to the auxiliary variable pressure, an averaging of the measured values in the individual ranges is performed, and a determination of the parameters of the linear relationship is undertaken by the values averaged in the individual ranges.

14. The method according to claim 3, a reset of the first and second assignments of values of the pressure of the trailer brakes to values of the pressure of the tractor brakes and to positions of a braking value sensor is effected when the road train is stationary for longer than a specific duration.

15. The first and second method according to claim 3, wherein a reset of the first and second assignments of values of the pressure of the trailer brakes to values of the pressure of the tractor brakes and to positions of a braking value sensor is effected when an engine of the road train is switched off.

* * * * *